(12) United States Patent
Chisu et al.

(10) Patent No.: US 12,155,789 B2
(45) Date of Patent: Nov. 26, 2024

(54) ADJUSTING TRANSMIT AUDIO AT NEAR-END DEVICE BASED ON BACKGROUND NOISE AT FAR-END DEVICE

(71) Applicant: Motorola Mobility LLC, Chicago, IL (US)

(72) Inventors: Daniel C. Chisu, Franklin Park, IL (US); Joseph C. Dwyer, Downers Grove, IL (US); Giles T. Davis, Downers Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/844,323

(22) Filed: Jun. 20, 2022

(65) Prior Publication Data

US 2023/0412727 A1 Dec. 21, 2023

(51) Int. Cl.
*H04M 3/18* (2006.01)
(52) U.S. Cl.
CPC .................................. *H04M 3/18* (2013.01)
(58) Field of Classification Search
CPC .......... H04M 3/18; H04M 9/082; H04M 9/08; H04M 9/085; H04M 1/60; H04M 1/19; H04M 1/6016; H04M 1/6008; H04M 3/40; H04M 1/20; H04M 1/035; H04M 3/2236; H04M 3/2227; H04M 1/0268; H04M 3/34; G10L 21/0208; G10L 21/02; G10L 21/0232; G10L 25/78; G10L 21/034; G10L 21/0364; G10L 2021/02087; G10L 21/0216; G10L 2021/02082; G10L 25/60; H04B 3/20; H04B 1/64; H04B 3/21; H04B 3/23; H04R 3/00; H04R 2430/03; H04R 3/02
See application file for complete search history.

(56) References Cited

U.S. PATENT DOCUMENTS

| 6,799,062 B1 * | 9/2004 | Piket ..................... H04M 9/082 |
| | | 379/406.01 |
| 6,980,528 B1 * | 12/2005 | LeBlanc .................. H04B 3/23 |
| | | 370/290 |
| 8,364,477 B2 | 1/2013 | Song et al. |
| 8,374,851 B2 * | 2/2013 | Unno ..................... H04M 9/082 |
| | | 379/406.01 |

(Continued)

FOREIGN PATENT DOCUMENTS

| CN | 1354873 A * | 6/2002 | ......... G10L 21/0208 |
| CN | 1672341 A * | 9/2005 | ............... H04B 3/23 |

(Continued)

*Primary Examiner* — Akelaw Teshale
(74) *Attorney, Agent, or Firm* — FIG. 1 Patents

(57) ABSTRACT

A voice call is established between two or more computing devices. The voice call may be, for example, audio only or audio and video. One computing device, referred to as a near-end device, receives a digital representation of background noise captured at another computing device, referred to as a far-end device. The near-end device captures voice audio from the user of the near-end device and adjusts the voice audio based at least in part on the digital representation of the background noise at the far-end device. The near-end device then transmits the adjusted voice audio to the far-end device for playback at the far-end device.

20 Claims, 10 Drawing Sheets

(56) References Cited

U.S. PATENT DOCUMENTS

| | | | |
|---|---|---|---|
| 8,625,775 B2* | 1/2014 | Bhaskar | H04M 9/082 379/406.01 |
| 8,645,129 B2* | 2/2014 | LeBlanc | G10L 19/012 704/226 |
| 8,762,138 B2* | 6/2014 | Holtel | H04M 3/18 704/226 |
| 9,185,199 B2 | 11/2015 | Zurek et al. | |
| 9,495,960 B1* | 11/2016 | Moore | H04M 9/082 |
| 11,595,462 B2* | 2/2023 | Chisu | H04L 65/1083 |
| 2007/0160154 A1* | 7/2007 | Sukkar | G10L 19/24 704/E19.044 |
| 2009/0106021 A1 | 4/2009 | Zurek et al. | |
| 2009/0111507 A1* | 4/2009 | Chen | H04M 1/6008 381/92 |
| 2009/0132248 A1* | 5/2009 | Nongpiur | G10L 21/0208 704/233 |
| 2009/0281805 A1* | 11/2009 | LeBlanc | G10L 21/0208 704/E15.039 |
| 2011/0181452 A1* | 7/2011 | Raifel | H04R 3/02 341/110 |
| 2014/0064508 A1* | 3/2014 | Su | G10L 21/0208 381/71.6 |
| 2015/0142702 A1* | 5/2015 | Nilsson | G06N 20/00 706/14 |
| 2015/0149159 A1* | 5/2015 | Dimitriadis | H04M 3/2236 704/226 |
| 2015/0296294 A1* | 10/2015 | Paquier | G10K 11/17881 381/71.1 |
| 2018/0167515 A1* | 6/2018 | Shi | H04M 3/568 |
| 2019/0082145 A1* | 3/2019 | McArdle | H04N 7/15 |
| 2019/0156847 A1* | 5/2019 | Bryan | G10L 21/0232 |

FOREIGN PATENT DOCUMENTS

| | | | | |
|---|---|---|---|---|
| CN | 1810015 A | * | 7/2006 | H04M 9/082 |
| CN | 1890947 A | * | 1/2007 | H04M 9/082 |
| CN | 106205595 B | * | 6/2020 | G10K 11/17827 |
| EP | 3091537 A1 | * | 11/2016 | G10L 21/0202 |
| GB | 2519117 A | * | 4/2015 | G10L 21/0208 |
| WO | WO-9212583 A1 | * | 7/1992 | H04M 9/082 |
| WO | WO-0039991 A1 | * | 7/2000 | H04M 9/08 |
| WO | WO-0070853 A2 | * | 11/2000 | H04M 9/082 |
| WO | WO-0110102 A2 | * | 2/2001 | H04B 3/21 |
| WO | WO-0215395 A1 | * | 2/2002 | H03G 3/32 |
| WO | WO-2004077806 A1 | * | 9/2004 | H03G 3/32 |

* cited by examiner

ADJUSTING TRANSMIT AUDIO AT NEAR-END DEVICE BASED ON BACKGROUND NOISE AT FAR-END DEVICE

BACKGROUND

As technology has advanced our uses for computing devices have expanded. One such use is people communicating with one another, such as via voice or video calls on their computing devices. However, such communication is not without its problems. One such problem is that background noise at either or both of two computing devices may interfere with the quality of a user's voice during the call. These problems can be frustrating for users, leading to user frustration with their devices and communication applications.

BRIEF DESCRIPTION OF THE DRAWINGS

Embodiments of adjusting transmit audio at near-end device based on background noise at far-end device are described with reference to the following drawings. The same numbers are used throughout the drawings to reference like features and components.

DETAILED DESCRIPTION

Adjusting transmit audio at near-end device based on background noise at far-end device is discussed herein. Generally, a voice call is established between two or more computing devices. The voice call may be audio only or audio and video. One computing device, referred to as a near-end device, receives a digital representation of background noise captured at another computing device, referred to as a far-end device. The near-end device captures voice audio from the user of the near-end device and adjusts the voice audio based at least in part on the digital representation of the background noise at the far-end device. The near-end device then transmits the adjusted voice audio to the far-end device for playback at the far-end device.

In contrast to traditional systems that account for noise at the near-end device, the techniques discussed herein adjust, at the near-end device, the voice audio transmitted to the far-end device based at least in part on the digital representation of background noise at the far-end device. Accordingly, the techniques discussed herein allow the near-end device to adjust the voice audio transmitted to the far-end device so that the voice audio can be better heard at the far-end device given the background noise at the far-end device. Additional actions may be taken by the far-end device to account for the background noise at the far-end device, such as applying any of various noise cancellation techniques. However, the techniques discussed herein allow the near-end device to improve the voice audio at the far-end device in ways the far-end device cannot, such as by increasing the gain of the voice audio transmitted by the near-end device.

Figure 1:
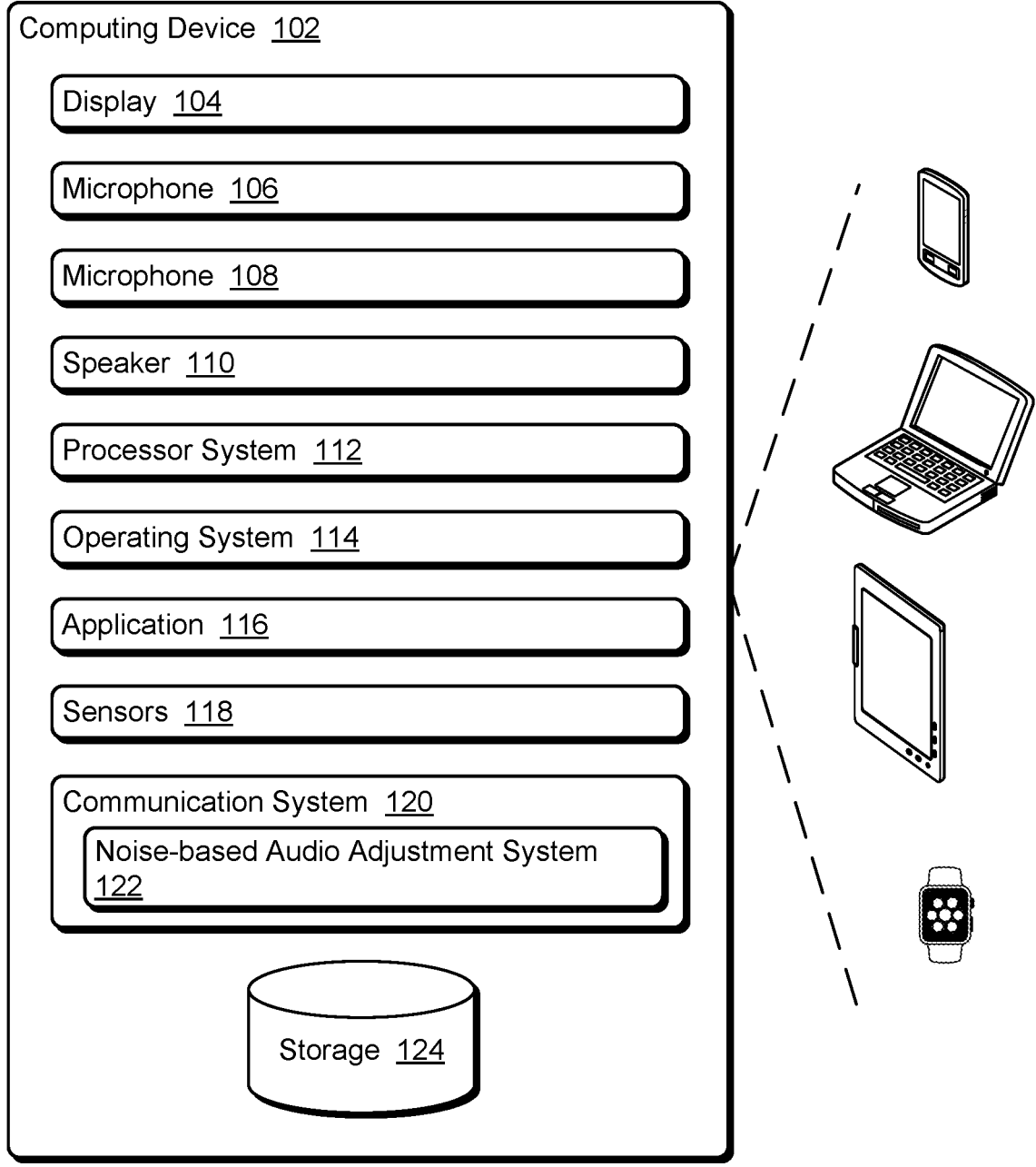
FIG. 1 illustrates an example computing device implementing the techniques discussed herein.

FIG. 1 illustrates an example computing device 102 implementing the techniques discussed herein. The computing device 102 can be many different types of computing or electronic devices. For example, the computing device 102 can be a smartphone or other wireless phone, a notebook computer (e.g., netbook or ultrabook), a laptop computer, a wearable device (e.g., a smartwatch, augmented reality headsets or glasses, virtual reality headsets or glasses), a tablet or phablet computer, an Internet of Things (IoT) device, an automotive computer, and so forth.

The computing device 102 includes a display 104, microphones 106 and 108, and a speaker 110. The display 104 can be configured as any suitable type of display, such as an organic light-emitting diode (OLED) display, active matrix OLED display, liquid crystal display (LCD), in-plane shifting LCD, projector, and so forth. The microphones 106 and 108 can each be configured as any suitable type of microphone incorporating a transducer that converts sound into an electrical signal, such as a dynamic microphone, a condenser microphone, a piezoelectric microphone, and so forth. The speaker 110 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the computing device 102, it should be noted that one or more of the display 104, the microphone 106, the microphone 108, and the speaker 110 can be implemented separately from the computing device 102. In such situations, the computing device 102 can communicate with the display 104, the microphone 106, the microphone 108, and/or the speaker 110 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable. By way of another example, the speaker 110 may be separate from the computing device 102 (e.g., the computing device 102 may be a mobile device and the speaker 110 may be a portable Bluetooth speaker or headset).

The computing device 102 also includes a processor system 112 that includes one or more processors, each of which can include one or more cores. The processor system 112 is coupled with, and may implement functionalities of, any other components or modules of the computing device 102 that are described herein. In one or more embodiments, the processor system 112 includes a single processor having a single core. Alternatively, the processor system 112 includes a single processor having multiple cores or multiple processors (each having one or more cores).

The computing device 102 also includes an operating system 114. The operating system 114 manages hardware, software, and firmware resources in the computing device 102. The operating system 114 manages one or more applications 116 running on the computing device 102 and operates as an interface between applications 116 and hardware components of the computing device 102.

The computing device 102 also includes one or more sensors 118. A variety of different types of sensors 118 can be included in the computing device 102, such as a thermal sensor, a proximity sensor, an image capture device (e.g., a camera), an active IR sensor, a passive IR sensor, a fingerprint sensor, and so forth.

The computing device 102 also includes a communication system 120. The communication system 120 establishes a communication link (also referred to as a communication channel) with one or more other devices over which a call (e.g., voice or video) occurs. The computing device 102 may also be referred to as a near-end device and the one or more other devices with which the computing device 102 establishes a communication link may each also be referred to as a far-end device or a remote device. Each far-end device can be a computing device analogous to computing device 102 or can be a traditional non-computing based device (e.g., a traditional landline phone). The communication link can be established in accordance with any of a variety of different standards or protocols, and the establishment of the communication link can be initiated by the computing device 102 or a far-end device.

The communication link can be established over any of a variety of networks, such as a local area network (LAN), a wide area network (WAN), a metropolitan area network (MAN), a telephone network (e.g., a public switched telephone network (PSTN), a cellular network, a Wi-Fi network, an intranet, the Internet, an optical fiber (or fiber optic)-based network, an enterprise network, a carrier network, a service provider network), or a combination thereof.

The communication link can be established using any of a variety of different wired or wireless technologies, networks, connections, and so forth. Furthermore, the communication link use any of a variety of different public or proprietary standards, protocols, and so forth. For example, the communication link can be established over a fourth generation (4G) cellular network, a fifth generation (5G) cellular network, the Internet, a Wi-Fi network, combinations thereof, and so forth. By way of another example, the communication link can be established in accordance with the voice over long-term evolution (VoLTE) standard, the Voice over New Radio (VoNR) standard, voice over Internet Protocol (VoIP) standards, Video Telephony (VT) standards, Push to Talk standards, and so forth. It should be noted that these networks can include carrier-provided networks (e.g., VoLTE, VT, Push to Talk, VoNR) as well as non-carrier-provided networks or service provider networks (e.g., third party video conference or voice call applications communicating via the Internet or other data network).

The communication system 120 also includes a noise-based audio adjustment system 122. The noise-based audio adjustment system 122 receives an indication (e.g., a digital representation) of background noise at a far-end device and adjusts voice audio received at the computing device 102 (e.g., from a user of the computing device 102) based at least in part on the indication of background noise at the far-end device. This adjustment can take any of various forms, such as adjusting a target level of noise suppression, adjusting an amount of transmit (TX) gain used, adjusting a shape of TX equalization, adjusting compression or expansion thresholds used for dynamic range control, and so forth as discussed in more detail below.

The communication system 120 can be implemented in a variety of different manners. For example, the communication system 120 can be implemented as multiple instructions stored on computer-readable storage media and that can be executed by the processor system 112 (e.g., a computer-readable storage media with multiple instructions stored thereon that cause the processor system 112 to perform various acts or operations). Additionally or alternatively, the communication system 120 can be implemented at least in part in hardware (e.g., as an application-specific integrated circuit (ASIC), a field-programmable gate array (FPGA), and so forth). The communication system 120 is implemented using various hardware, firmware, or software components, such as a transceiver, to support communication over one or more networks.

The computing device 102 also includes a storage device 124. The storage device 124 can be implemented using any of a variety of storage technologies, such as magnetic disk, optical disc, Flash or other solid state memory, and so forth. The storage device 124 can store various program instructions and data for the operating system 114, application 116, or communication system 120.

It should be noted that although discussed herein with reference to a near-end device and a far-end device, each far-end device can also perform the functionality discussed herein (essentially operating, from that far-end device's point of view, as a near-end device). For example, each far-end device can receive an indication (e.g., a digital representation) of background noise at another device and adjust voice audio received at the far-end device (e.g., from a user of the far-end device) based at least in part on the indication of background noise at the other device.

Figure 2:
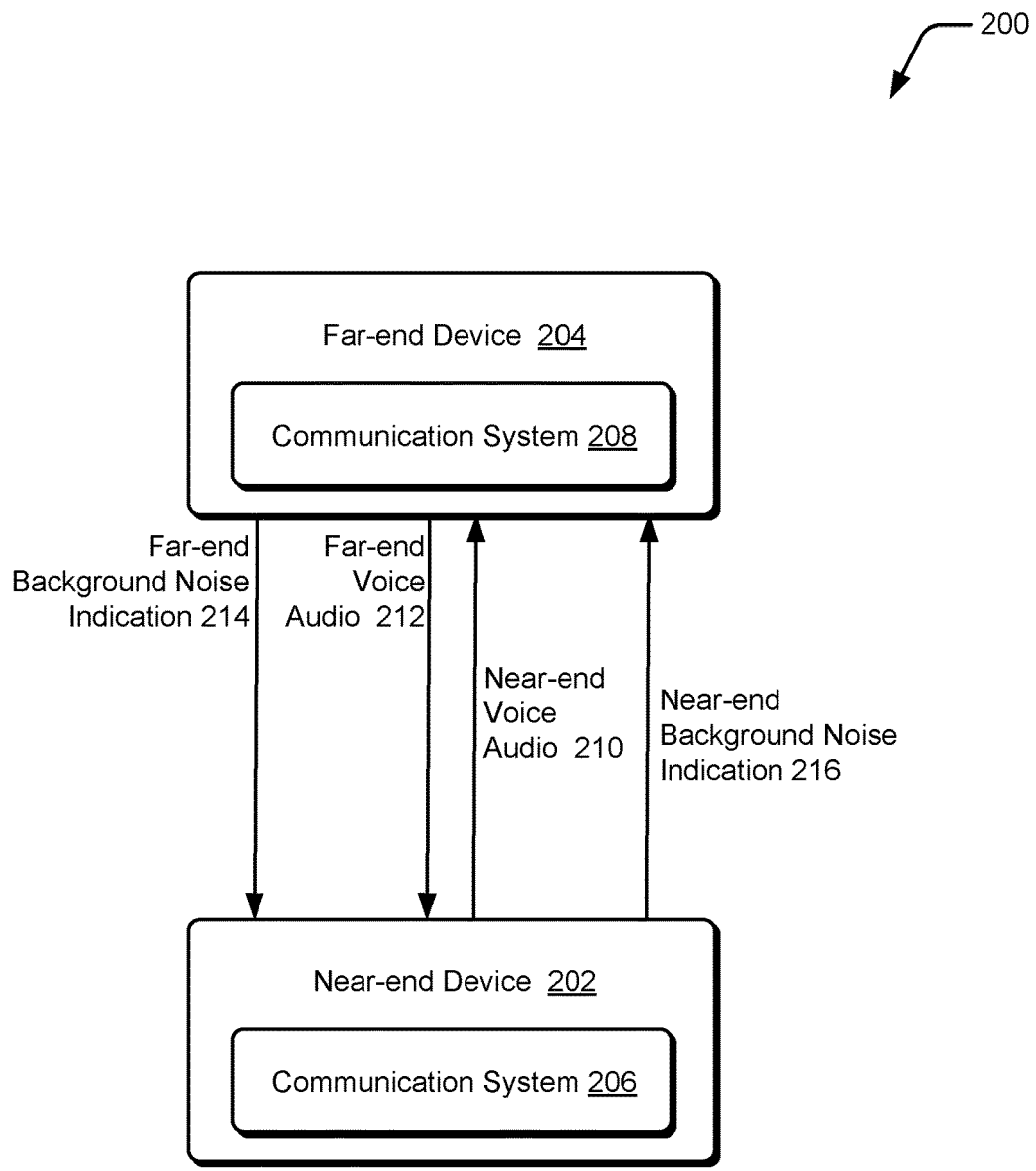
FIG. 2 illustrates an example environment in which the adjusting transmit audio at near-end device based on background noise at far-end device can be implemented.

FIG. 2 illustrates an example environment 200 in which the adjusting transmit audio at near-end device based on background noise at far-end device can be implemented. The environment 200 includes a near-end device 202 and a far-end device 204. The near-end device 202 is a computing device 102 of FIG. 1 and includes a communication system 206 (analogous to communication system 120 of FIG. 1). The far-end device 204 can be a computing device analogous to the computing device 102 or another type of device, and includes a communication system 208 (analogous to communication system 120 of FIG. 1). The near-end device 202 and the far-end device 204 establish a call between each other with the near-end device 202 transmitting near-end voice audio 210 to the far-end device 204, and the far-end device 204 transmitting far-end voice audio 212 to the near-end device 202. The call can be a voice call, a video call, combination thereof, and so forth.

The far-end device 204 also transmits to the near-end device 202 a far-end background noise indication 214, which is a digital representation of background noise at the far-end device 204 as detected by the far-end device 204. The communication system 206 uses the far-end background noise indication 214 to adjust the near-end voice audio 210 transmitted to the far-end device 204. Similarly, the near-end device 202 also transmits to the far-end device 204 a near-end background noise indication 216, which is a digital representation of background noise at the near-end device 202 as detected by the near-end device 202. The communication system 208 uses the near-end background noise indication 216 to adjust the far-end voice audio 212 transmitted to the near-end device 202.

Figure 3:
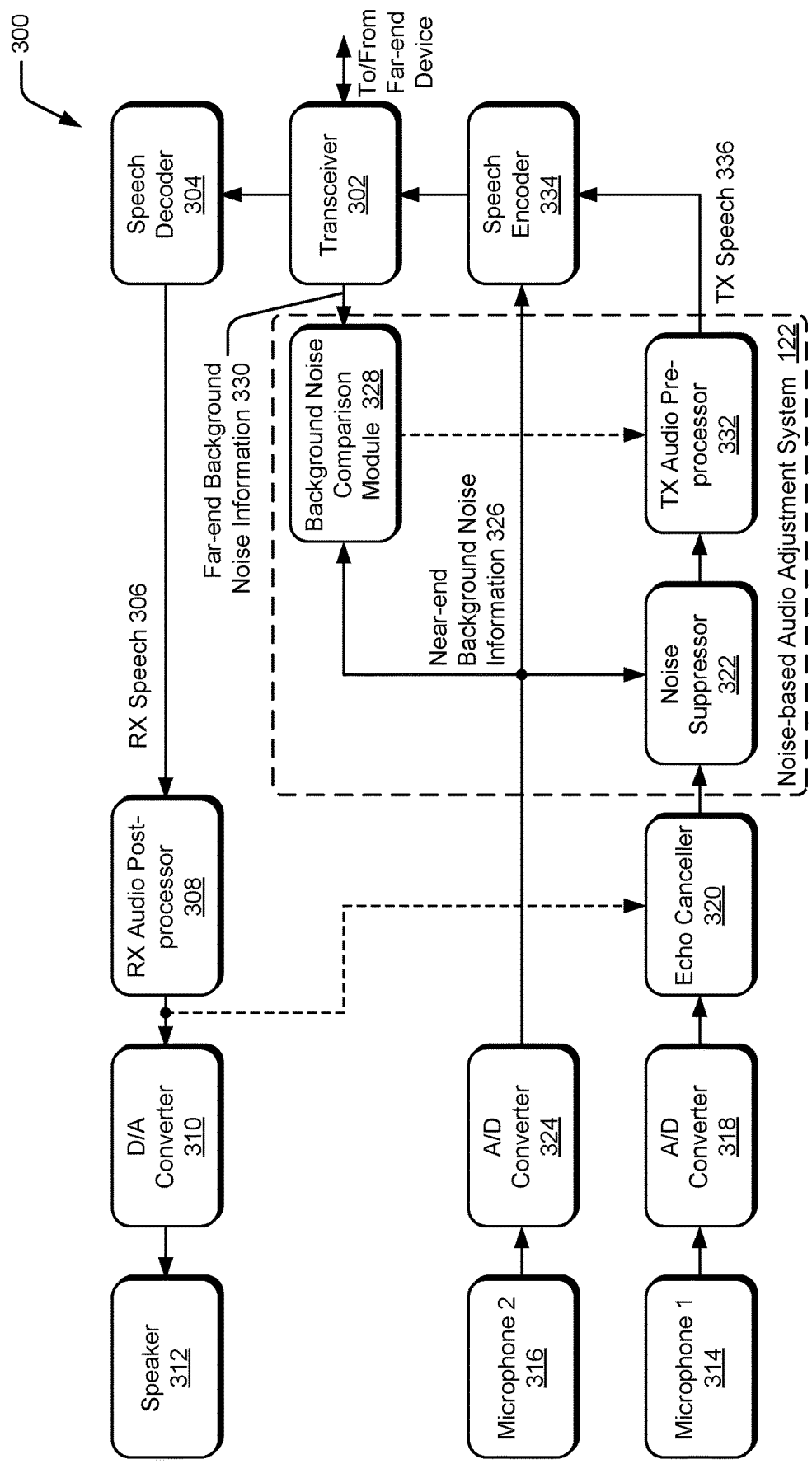
FIG. 3 illustrates an example system implementing the techniques discussed herein.

FIG. 3 illustrates an example system 300 implementing the techniques discussed herein. The system 300 is implemented at least in part, for example, by a near-end device, such as the near-end device 202 of FIG. 2. A voice call is established between the near-end device and a far-end device, such as the far-end device 204 of FIG. 2. The voice call refers to any communication or call that includes voice, such as an audio-only call or an audio and video call (e.g., a video conference). Although discussed with reference to being the near-end device, it is to be appreciated that the far-end device can implement an analogous system 300.

The voice call can be established using any of a variety of techniques, such as using an Internet protocol (IP) multimedia subsystem (IMS), using a voice over IP (VoIP) system, using a circuit-switched network, and so forth.

In the system 300, a transceiver 302 receives far-end voice audio from a far-end device. This far-end voice audio is, for example, a digital representation of voice audio received via a microphone at the far-end device.

The received far-end voice audio is provided to a speech decoder 304. The far-end voice audio may also include other non-voice audio, such as far-end background noise, which is filtered out by the speech decoder 304. The speech decoder 304 provides the filtered voice audio, illustrated as receive (RX) speech 306, to an RX audio post-processor 308.

The RX audio post-processor 308 performs post-processing on the RX speech 306 to change the characteristics of the RX speech 306. These changes are to, for example, enhance or suppress various features of the RX speech 306. Any of a variety of public or proprietary techniques or algorithms can be used by the RX audio post-processor 308 to change the characteristics of the RX speech 306, such as altering the gain of the RX speech 306, applying an infinite impulse response (IIR) filter to the RX speech 306, perform multi-band dynamic range compression on the RX speech 306, and so forth.

The RX audio post-processor 308 outputs the post-processed RX speech to a digital to analog (D/A) converter 310, which converts the digital post-processed RX speech from a digital to an analog format. The D/A converter 310 transmits the analog post-processed RX speech to a speaker 312 for playback. The speaker 312 is, for example, a speaker 110 of FIG. 1.

The system 300 also includes a microphone 314 and a microphone 316, which can be, for example, microphones 106 and 108 of FIG. 1. Accordingly, the microphones 314 and 316 can be any of a variety of different types of microphones as discussed above.

The microphone 314 receives (e.g., picks up or senses) audio input and provides the audio input to an analog to digital (A/D) converter 318. The audio input received by the microphone 314 includes audio voice input (e.g., the speech of a user of the system 300).

The A/D converter 318 converts the audio input to digital form, outputting the digital audio input to an echo canceller 320. The echo canceller 320 receives the post-processed RX speech from the RX audio post-processor 308 and cancels or removes the audio output by the speaker 312 from the audio input received by the microphone 314. This cancellation can be performed in any of a variety of different manners, such as by subtracting, after a time delay, the post-processed RX speech from the digital audio input received from the A/D converter 318. The echo canceller 320 provides the resultant (echo canceled) audio input to a noise suppressor 322.

The microphone 316 receives (e.g., picks up or senses) background noise at the system 300. This background noise refers to audio other than the voice of the user of the system 300. In one or more implementations, the microphone 316 is optionally facing a direction other than the direction of the microphone 314 (e.g., an opposite direction), allowing the microphone 316 to better pick up or sense the voice of the user of the system 300 and allowing the microphone 314 to better pick up or sense the background noise. The microphones 314 and 316 (and optionally one or more additional microphones) may also together form one or more directional microphones.

The microphones 314 and 316 are physically separated such that the level of the user's voice reaching the microphone 316 is lower than the level of the user's voice reaching the microphone 314 by at least some fixed amount across the voice call audio band. Keeping the voice level difference or delta received by the microphones 314 and 316 above a threshold level allows the noise suppressor 322 to discriminate between the user's voice and background noise. This threshold level may vary and in one or more implementations is determined by the capability of the noise suppression algorithm used by the noise suppressor 322.

In one or more implementations, the microphone 316 picks up audio in frequency ranges not typically associated with human speech or human hearing. Accordingly, such audio is considered background noise. The microphone may also pick up audio in frequency ranges typically associated with human speech or human hearing.

The microphone 316 provides the background noise to an A/D converter 324, which converts the background noise to digital form and outputs the digital background noise as near-end background noise information 326. The near-end background noise information 326 is provided to various components including the noise suppressor 322. The noise suppressor 322 also receives the audio input from the echo canceller 320. The noise suppressor 322 uses the near-end background noise information 326 to cancel or remove the background noise from the audio input received by the microphone 314. This cancellation or removal can be performed in any of a variety of different manners, such as by subtracting the background noise from the audio input received from the echo canceller 320.

The A/D converter 324 also provides the near-end background noise information 326 to a background noise comparison module 328. The transceiver 302 also receives far-end background noise information from the far-end device and provides the far-end background noise information to the background noise comparison module 328 as far-end background noise information 330.

The background noise information, whether near-end background noise information 326 or far-end background noise information 330, is information that describes the background noise. This background noise information may also be referred to as a noise signature (or background noise signature). The background noise information can take any of a variety of forms, such as a sample of the background noise, periodic spectrum information describing the background noise such as fast Fourier transforms (FFTs), and so forth.

The background noise comparison module 328 determines, based on one or both of the near-end background noise information 326 and the far-end background noise information 330, what adjustment (if any) to make to the audio input from the echo canceller 320. The background noise comparison module 328 provides an indication of this adjustment (if any) to a transmit (TX) audio pre-processor 332. The TX audio pre-processor 332 also receives the audio input (after noise cancellation or removal by the noise suppressor 322) and makes any adjustment to the audio input indicated by the background noise comparison module 328. The TX audio pre-processor 332 provides the resultant adjusted audio input to a speech encoder 334 as TX speech 336.

The speech encoder 334 receives the TX speech 336 as well as the near-end background noise information 326 and encodes both the TX speech 336 and the near-end background noise information 326 for transmission to the far-end device by the transceiver 302. The speech encoder 334 encodes the TX speech 336 and the near-end background noise information 326 in any of a variety of different manners based at least in part the technique or protocol used to establish the voice call with the far-end device.

In the illustrated example of FIG. 3, the speech encoder 334 encodes the near-end background noise information 326 into the same signaling or packets (e.g., the same connection) as the TX speech 336. Additionally or alternatively, a separate IP connection can be established between the near-end device and the far-end device for transmitting the near-end background noise information 326 to the far-end device. In such situations, two IP connections may be established to transmit data from the near-end device to the far-end device, one IP connection to transmit the TX speech 336 and another IP connection to transmit the near-end background noise information 326. Examples of techniques for transmitting the near-end background noise information 326 to the far-end device are discussed in more detail below.

The background noise comparison module 328 continually or regularly receives the near-end background noise information 326 and the far-end background noise information 330, allowing the background noise comparison module 328 to change how the voice audio is adjusted as the far-end background noise changes. The techniques discussed herein allow the near-end device to dynamically improve the intelligibility of its TX speech by responding to regularly updated information regarding both the near-end and far-end background noise.

The background noise comparison module 328 can indicate for the TX audio pre-processor 332 to adjust the voice audio in any one or more of various manners. For example, the adjustments may include adjusting (e.g., increasing or decreasing) a target level of noise suppression, adjusting (e.g., increasing or decreasing) an amount of TX gain used, changing a shape of the TX equalization, adjusting (e.g., increasing or decreasing) compression or expansion thresholds used for dynamic range control, adjusting (e.g., increasing or decreasing) the target noise suppression applied based on the presence or absence of speech audio (e.g., voice activity), and so forth.

By way of example, in one or more implementations the target level of noise suppression (e.g., used by the noise suppressor 322 or the TX audio pre-processor 332) is gradually reduced when the far-end background noise level exceeds the near-end background noise level. The target level of noise suppression refers to an amount of near-end background noise (in dB) that the noise suppressor 322 or the TX audio pre-processor is attempting to remove from the audio received by the microphone 314. The target level of noise suppression reaches a minimum level or noise suppression is completely disabled when the difference between the far-end background noise level and the near-end background noise level equals or exceeds a threshold amount (e.g., 10 decibels (dB)).

The threshold amount is determined in any of a variety of manners, such as empirically. For example, the threshold amount may be set to an amount at which performing near-end noise suppression is of little value based on the far-end background noise level. E.g., performing near-end noise suppression when the near-end background noise level is the threshold amount (e.g., 10 dB) quieter than the far-end background noise level is of little value.

By way of another example, in one or more implementations TX gain is gradually added when the far-end background noise level exceeds the near-end background noise level.

In the examples discussed herein, reference is made to minimum amounts or values as well as maximum amounts or values. It is to be appreciated that these minimum and maximum amounts or values are given as examples in various implementations, and that different amounts or values may be used in different implementations.

Figure 4:
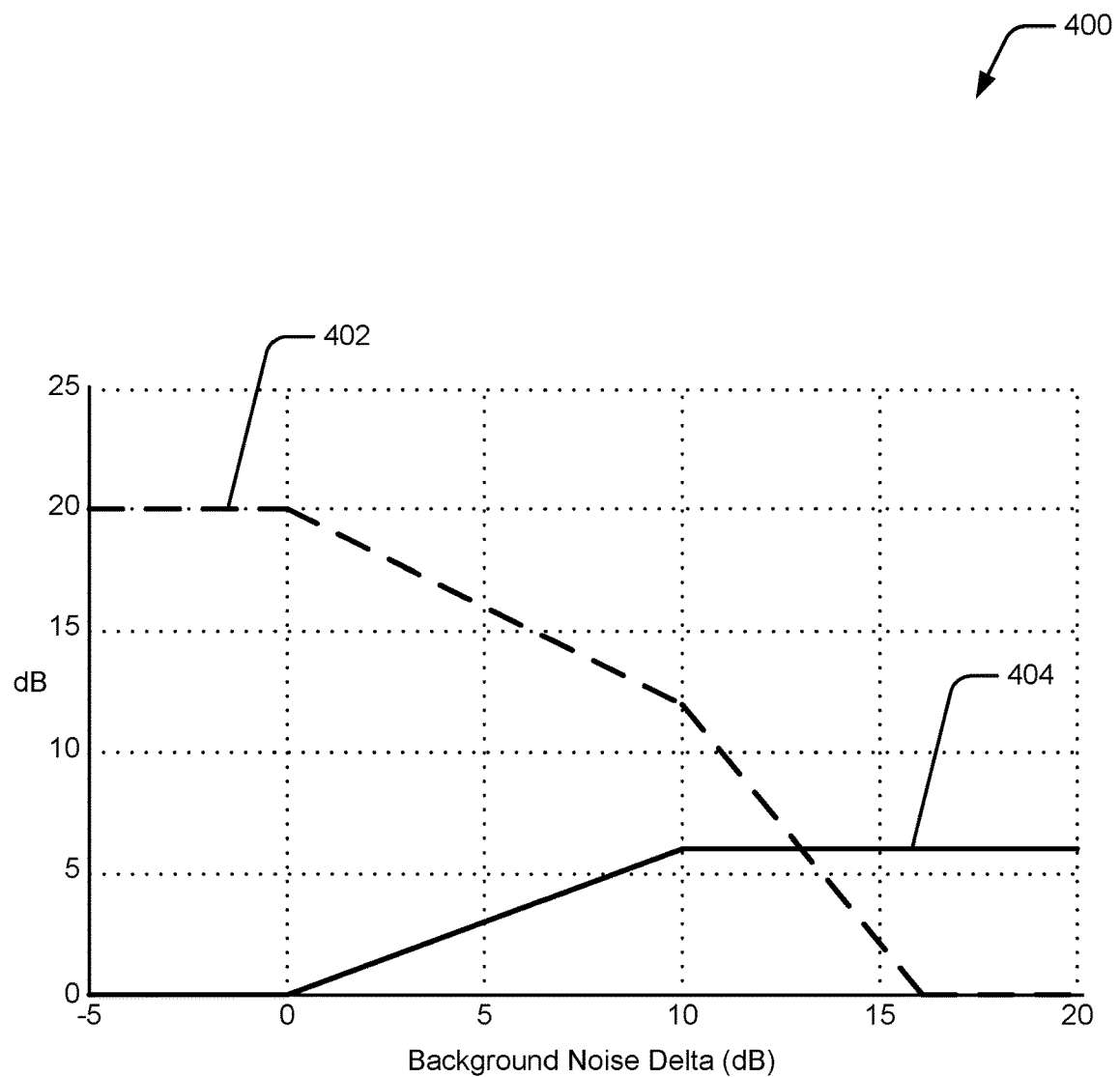
FIG. 4 illustrates an example of adjusting transmit audio at near-end device based on background noise at far-end device in accordance with one or more embodiments.

FIG. 4 illustrates an example 400 of adjusting transmit audio at near-end device based on background noise at far-end device in accordance with one or more embodiments. The example 400 illustrates adjusting the target level of noise suppression and the amount of TX gain applied based upon the difference between the near-end and far-end background noise levels. The example 400 shows the background noise delta in dB along the horizontal axis, target noise suppression applied in dB along the vertical axis and dashed line 402, and gain applied in dB along the vertical axis and solid line 404. The background noise delta is generated by subtracting the near-end background noise from the far-end background noise.

In the illustrated example, a target noise suppression of between 0 and 20 dB is applied, and a TX gain of between 0 and 6 dB is applied. As illustrated, when the background noise delta is less than or equal to 0 dB, the maximum target noise suppression (20 dB) is applied and no TX gain (0 dB) is applied.

When the background noise delta is greater than 0 dB but less than or equal to a threshold amount (e.g., 10 dB), the target noise suppression is reduced approximately linearly from 20 dB to approximately 12 dB, and the TX gain is increased approximately linearly from 0 dB to 6 dB.

When the background noise delta is greater than the threshold amount (e.g., 10 dB) but less than the sum of the threshold amount (e.g., 10 dB) and the maximum TX gain applied (6 dB in this example), the target noise suppression is reduced approximately linearly from approximately 12 dB to 0 dB, and the maximum TX gain (6 dB in this example) is applied.

When the background noise delta is greater than the threshold amount (e.g., 10 dB) and the maximum TX gain applied (6 dB in this example), no target noise suppression (e.g., 0 dB) is applied and the maximum TX gain (6 dB in this example) is applied.

Figure 5:
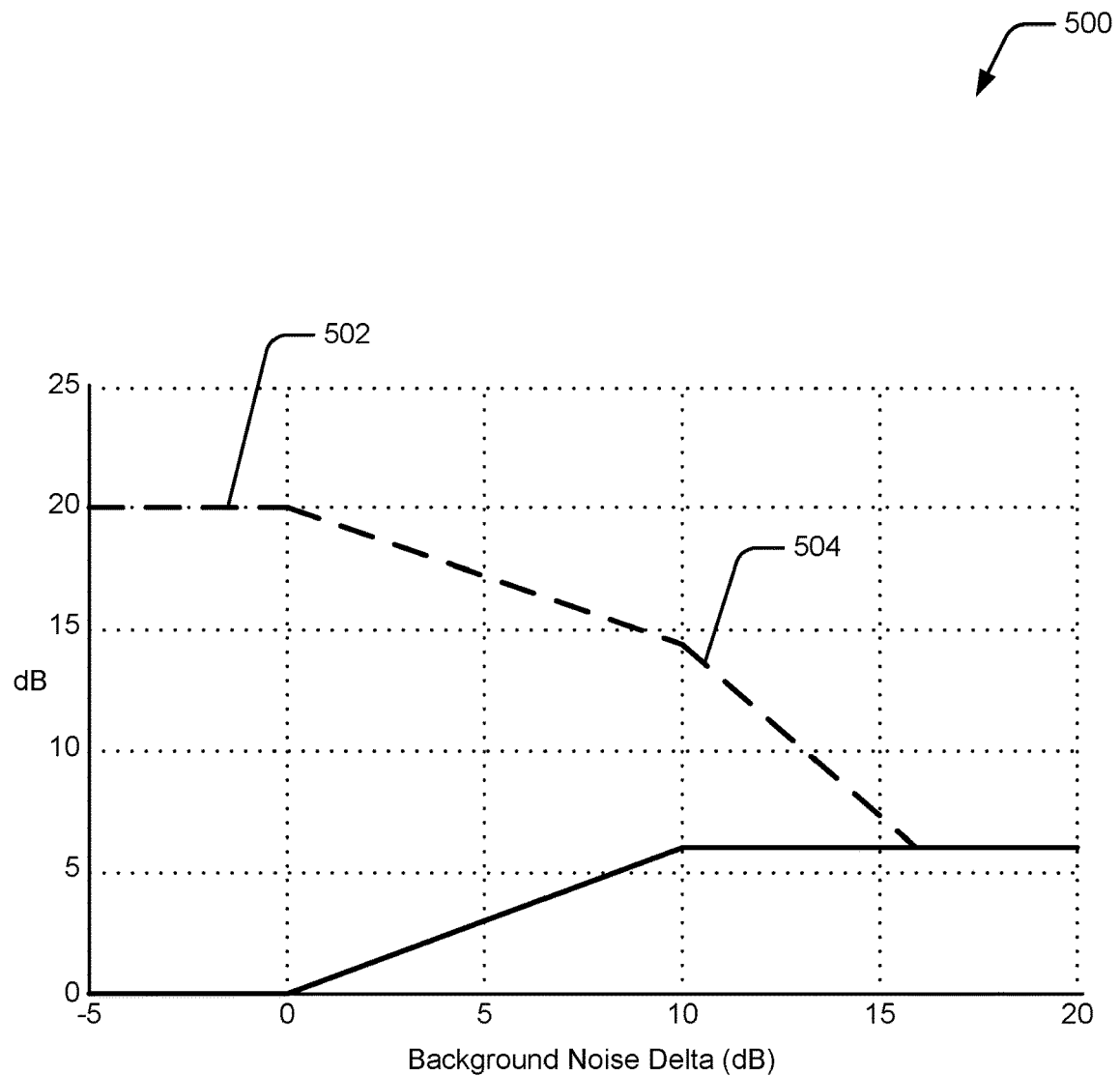
FIG. 5 illustrates another example of adjusting transmit audio at near-end device based on background noise at far-end device in accordance with one or more embodiments.

FIG. 5 illustrates an example 500 of adjusting transmit audio at near-end device based on background noise at far-end device in accordance with one or more embodiments. The example 500 illustrates adjusting the target level of noise suppression and the amount of TX gain applied based upon the difference between the near-end and far-end background noise levels. The example 500 shows the background noise delta in dB along the horizontal axis, target noise suppression applied in dB along the vertical axis and dashed line 502, and gain applied in dB along the vertical axis and solid line 504. The background noise delta is generated by subtracting the near-end background noise from the far-end background noise.

In the illustrated example, a target noise suppression of between 6 and 20 dB is applied, and a TX gain of between 0 and 6 dB is applied. The example 500 is similar to the example 400 of FIG. 4, except that the target noise suppression is between 6 and 20 dB in the example 500 but between 0 and 20 dB in the example 400.

As illustrated, when the background noise delta is less than or equal to 0 dB, the maximum target noise suppression (20 dB) is applied and no TX gain (0 dB) is applied.

When the background noise delta is greater than 0 dB but less than or equal to a threshold amount (e.g., 10 dB), the target noise suppression is reduced approximately linearly from 20 dB to approximately 14 dB, and the TX gain is increased approximately linearly from 0 dB to 6 dB.

When the background noise delta is greater than the threshold amount (e.g., 10 dB) but less than the sum of the threshold amount (e.g., 10 dB) and the maximum TX gain applied (6 dB in this example), the target noise suppression is reduced approximately linearly from approximately 14 dB to 6 dB, and the maximum TX gain (6 dB in this example) is applied.

When the background noise delta is greater than the threshold amount (e.g., 10 dB) and the maximum TX gain applied (6 dB in this example), a minimum target noise suppression (e.g., 6 dB) is applied and the maximum TX gain (6 dB in this example) is applied.

Figure 6:
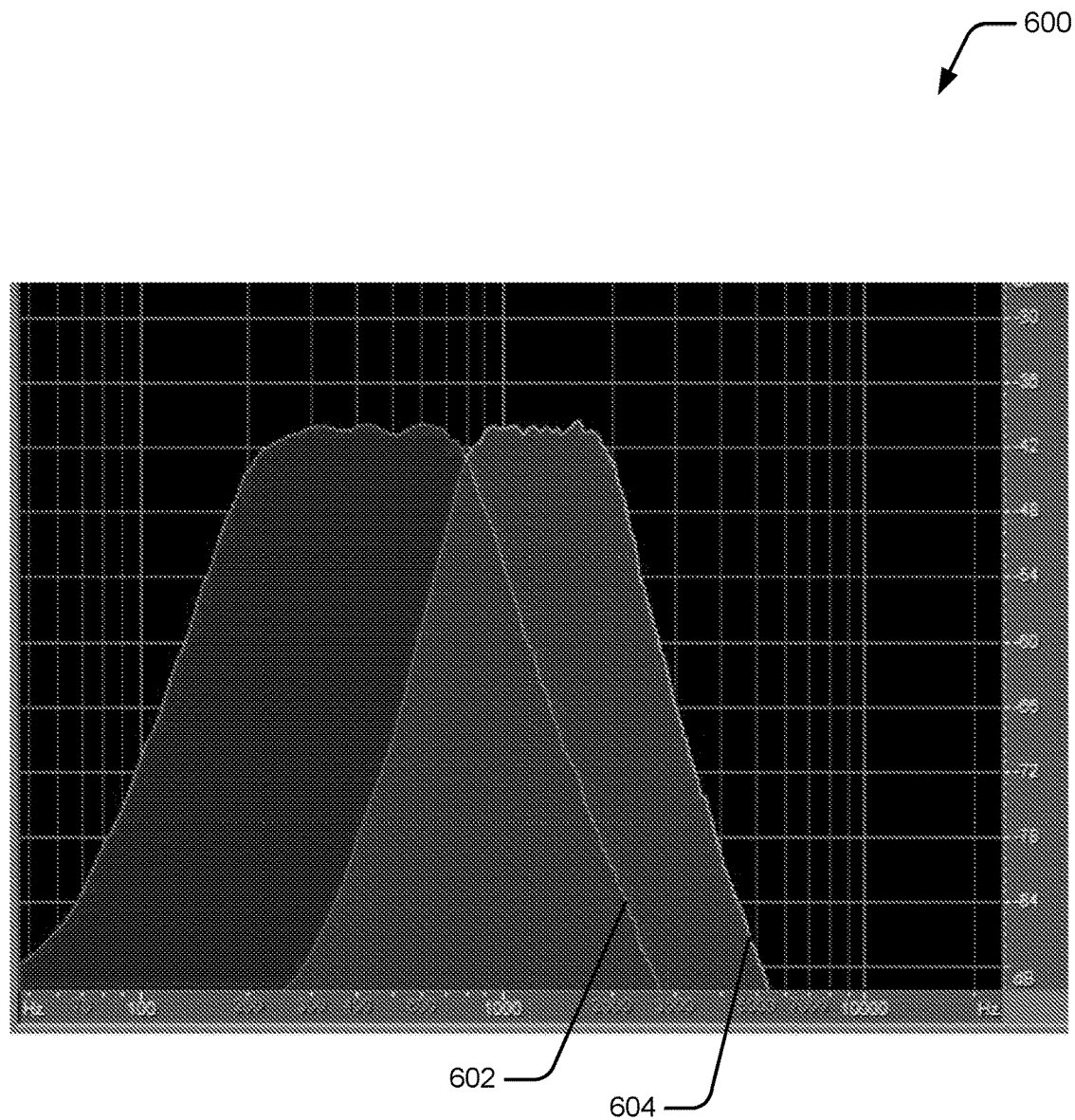
FIG. 6 illustrates another example of adjusting transmit audio at near-end device based on background noise at far-end device in accordance with one or more embodiments.

FIG. 6 illustrates an example 600 of adjusting transmit audio at near-end device based on background noise at far-end device in accordance with one or more embodiments. The example 600 illustrates how spectral analysis based on near-end and far-end background noise levels can be used to adjust the TX audio. The example 600 shows a curve 602 representing near-end background noise and a curve 604 representing far-end background noise. The example 600 illustrates a horizontal axis in hertz (Hz) and a vertical axis in dB.

The curve 602 peaks from approximately 200 Hz to approximately 800 Hz, and the curve 604 peaks from approximately 800 Hz to approximately 1800 Hz.

The noise suppressor on the near-end device attempts to reduce or eliminate the background noise shown by the curve 602. The near-end device also receives far-end background noise information describing the curve 604.

The noise suppressor on the far-end device attempts to reduce or eliminate the background noise shown by the curve 604. The far-end device also receives near-end background noise information describing the curve 602.

There is more energy under the curve 602, indicating more background noise on the near-end side than on the far-end side. Accordingly, the far-end device increases its TX gain and reduces the amount of noise suppression the far-end device applies.

Furthermore, based on the far-end background noise information, the near-end device boosts approximately 800 Hz to 1800 Hz in its TX audio relative to other frequencies to improve the intelligibility of the RX audio received at the far-end device. Similarly, based on the near-end device background noise information, the far-end device boosts approximately 200 Hz to 800 Hz in its TX audio relative to other frequencies to improve the intelligibility of the of the RX audio received at the near-end device.

Returning to FIG. 3, as illustrated the noise suppressor 322, the background noise comparison module 328, and the TX audio pre-processor 332 may make up the noise-based audio adjustment system 122 of FIG. 1.

In one or more implementations, the system 300 monitors or receives an indication of a signal quality (e.g., a radio frequency (RF) signal quality) for the established call. If the signal quality becomes poor (e.g., has fallen or dropped below a threshold level or amount), the system 300 takes one or more actions. For example, the system may cease transmitting near-end background noise information 326 to the far-end device. Additionally or alternatively, the TX audio pre-processor 332 also ceases adjusting the voice audio based on any far-end background noise information. Additionally or alternatively, the TX audio pre-processor 332 adjusts (e.g., increases or decreases) the amount of noise suppression applied to the audio input received by the TX audio pre-processor 332.

In one or more implementations, the near-end device is in communication with multiple far-end devices (e.g., on a conference call). In this situation, the near-end device receives far-end background noise information from the multiple far-end devices (or a subset of the multiple far-end devices) and determines the smallest difference between the near-end background noise level and the multiple far-end background noise levels (e.g., the smallest background noise delta). The adjustments applied for the voice audio to generate TX speech 336 transmitted to all of the multiple far-end devices is based on this determined smallest difference.

In one or more implementations, the system 300 transmits the near-end background noise information 326 to the far-end device, in response to determining that the far-end device supports the techniques discussed herein. This determination can be made in any of a variety of manners, such as an indication that the far-end device communicates to the system 300, establishment of an application-level IP connection between the near-end device and the far-end device (as discussed in more detail below), and so forth.

In the illustrated example, the system 300 includes two microphones 314 and 316. Additionally or alternatively, the system 300 may include more microphones (which detect background noise or voice audio). Additionally or alternatively, the system 300 may include a single microphone that receives both background noise and voice audio. In this situation the near-end background noise is detected, for example, during times when there is no speech received by the voice audio.

As discussed above, the near-end background noise information 326 can be transferred to the far-end device using any of a variety of different techniques. In one or more implementations, the near-end background noise information 326 is transferred to the far-end device using a secondary or parallel IP connection on the Internet or IMS packet data network (PDN). This transfer may be implemented at the applications layer with applications on each device making an end-to-end (E2E) connection at the time of the voice call setup. The devices in the call would be aware of the presence of this feature during the call setup phase, simply based on the intent to establish an IP connection between endpoints.

Additionally or alternatively, the near-end background noise information 326 is transferred to the far-end device using the primary or existing IP connection on the PDN (e.g., the IMS PDN). This may be implemented with real-time audio (e.g., voice over long-term evolution (VoLTE), voice over new radio (VoNR), or voice over Wi-Fi (VoWiFi)) and video calls (VT).

In this scenario, the support for the adjusting transmit audio at near-end device based on background noise at far-end device feature discussed herein may be signaled by the device in the session description protocol (SDP) offer (e.g., the call handshake). In the INVITE, the device advertises capabilities such as VoLTE calls, text, etc. using the m-tag. A feature called "enhanced audio" can be added that would signal support for this feature. The feature may be included as part of Rich Communication Suite (RCS). The devices in the call would be aware of the presence of this feature during the call setup phase, based on each other's SDP offers (E2E). Similarly, the device may first signal support for this feature when first registering with the IMS (or similar) server offering the service.

In one or more implementations, the near-end background noise information 326 is transferred to the far-end device using the primary or existing IP connection on the PDN by transferring background noise samples over the existing RTP session for the call using an existing call synchronization source (SSRC), by making changes in the real-time transport protocol (RTP) structure (e.g., using the same audio port with RTP modification). The speech frame structure can be modified to include a secondary payload besides the primary which contains the call audio, specifically for the noise channel. This secondary channel can optionally contain continuous streaming of noise samples, or only partial samples with silence insertion descriptor (SID) frames in between while notifying the RTP timestamps containing the start and finish of a noise sample. The receiving end will then demultiplex the RTP packets for each channel into separate channels.

Additionally or alternatively, the background noise samples may be transferred over a new SSRC by signaling a second media port in the SDP offer, to be used in addition to the first for the call audio. Each media stream will have its own unique SSRC. Both SSRCs will be part of the same RTP session. In this scenario, no modification need be made to the existing RTP structure. This second audio port will be used for transferring background noise samples. The media gateway server will route this data between devices as usual. In one or more implementations, the second SSRC used for noise samples contains audio encoded using the same speech codec and associated parameters as the main call audio. Additionally or alternatively, the second SSRC used for noise samples contains audio encoded using a different speech codec or codec parameters than the main call audio.

Additionally or alternatively, the near-end background noise information 326 is transferred to the far-end device using the primary or existing IP connection on the PDN by transferring background noise spectrum using real-time text (RTT) in a voice plus text call. In a RTT call, both RTT and voice can be used, at the same time or interchangeably, during the same call. The calling application would be modified to transmit real-time spectrum information instead of user text, since the noise spectrum (e.g., FFT) information can be just text format. The data may contain a matrix of frequency ranges on the X axis and root mean square (RMS) level on the Y axis. The spectrum information transferred in the background is hidden from the user as text. This technique allows the spectrum information to be transmitted in real-time as changes in the noise spectrum occur. In addition, only the changed frequency bands can be transmitted (send only changes from previous state as opposed to a full spectrum).

Figure 7:
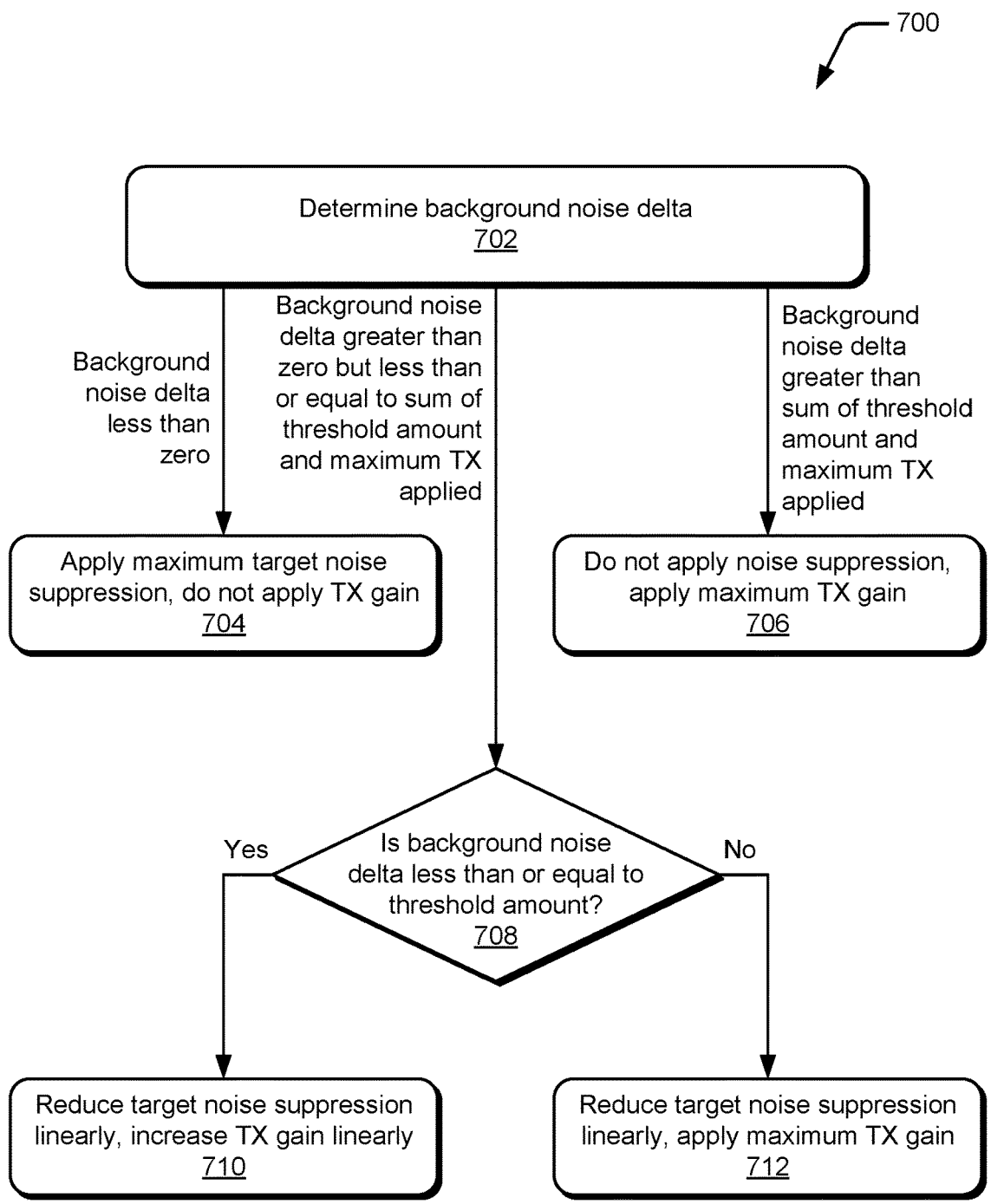
FIG. 7 illustrates an example process for implementing the techniques discussed herein in accordance with one or more embodiments.

FIG. 7 illustrates an example process 700 for implementing the techniques discussed herein in accordance with one or more embodiments. Process 700 is carried out by a noise-based audio adjustment system, such as noise-based audio adjustment system 122 of FIG. 1 or FIG. 2, and can be implemented in software, firmware, hardware, or combinations thereof. Process 700 is shown as a set of acts and is not limited to the order shown for performing the operations of the various acts.

In process 700, a background noise delta is determined (act 702). The background noise delta is the difference between the background noise at the device implementing the process 700 and the background noise at a far-end device. The background noise delta is generated, for example, by subtracting the near-end background noise from the far-end background noise.

If the background noise delta is less than zero, then maximum target noise suppression is applied and TX gain is not applied (act 704).

If the background noise delta greater than a sum of a threshold amount and (e.g., 10 dB) and a maximum TX applied (e.g., 20 dB), then noise suppression is not applied and the maximum TX is applied (act 706).

If the background noise delta is greater than zero but less than or equal to a sum of a threshold amount (e.g., 10 dB) and a maximum TX applied (e.g., 20 dB), then a check is made whether the background noise delta is less than or equal to the threshold amount (act 708).

If the background noise delta is less than or equal to the threshold amount, then the target noise suppression is reduced linearly and the TX gain is increased linearly (act 710).

If the background noise delta is not less than or equal to the threshold amount, then the target noise suppression is reduced linearly and the maximum TX gain is applied (act 712).

Figure 8:
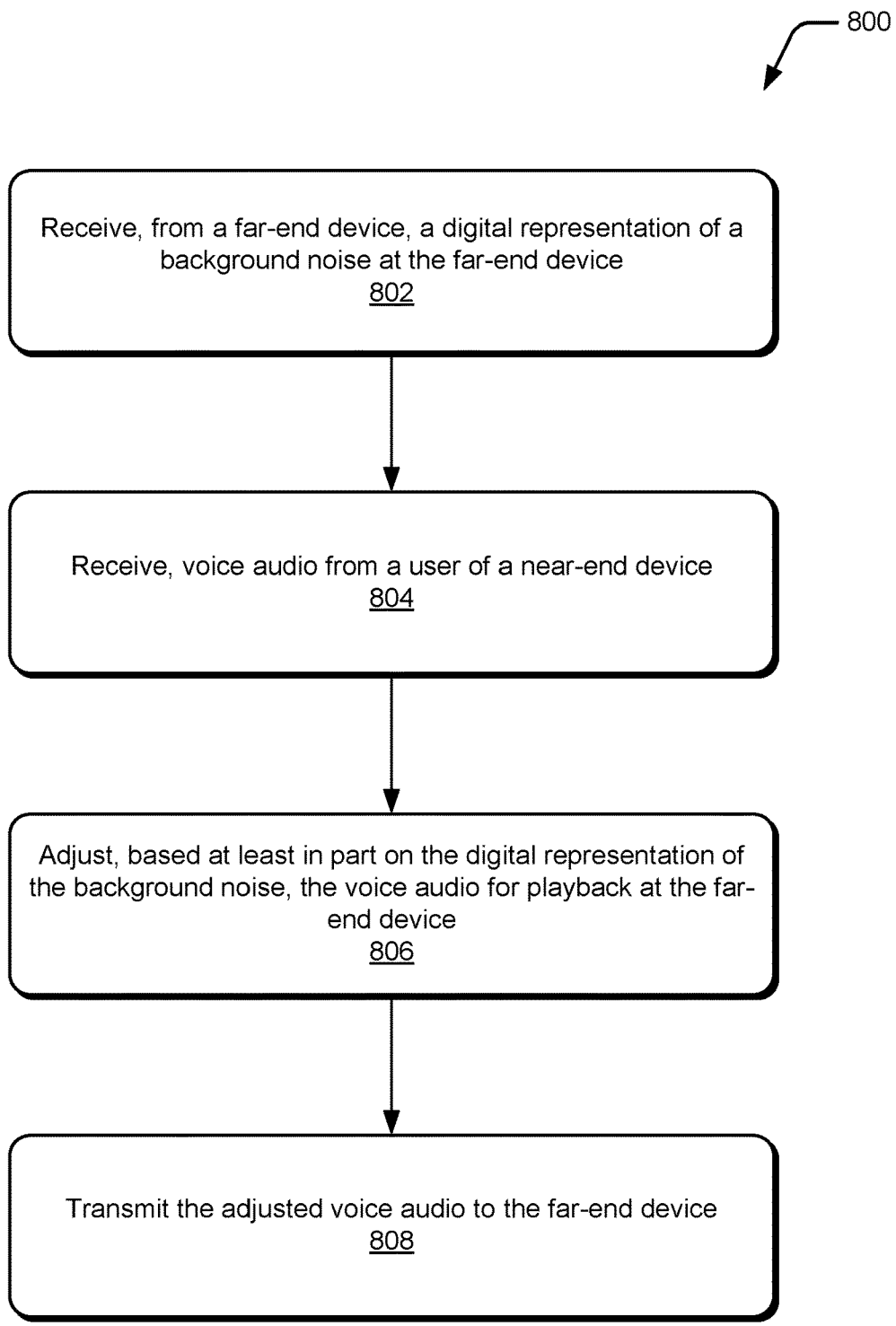
FIG. 8 illustrates another example process for implementing the techniques discussed herein in accordance with one or more embodiments.

FIG. 8 illustrates an example process 800 for implementing the techniques discussed herein in accordance with one or more embodiments. Process 800 is carried out by a device, such as a near-end device, and can be implemented in software, firmware, hardware, or combinations thereof. Process 800 is shown as a set of acts and is not limited to the order shown for performing the operations of the various acts.

In process 800, a digital representation of a background noise at the far-end device is received from the far-end device (act 802). This digital representation may take various forms, such as a noise sample from the far-end device, a FFT describing the background noise, and so forth.

Voice audio is received from a user of the device implementing process 800 using a microphone at the device implementing process 800 (act 804).

The voice audio is adjusted, based at least in part on the digital representation of the background noise, for playback at the far-end device (act 806). Various different adjustments may be made, such as adjusting (e.g., increasing or decreasing) a target level of noise suppression, adjusting (e.g., increasing or decreasing) an amount of TX gain used, changing a shape of the TX equalization, adjusting (e.g., increasing or decreasing) compression or expansion thresholds used for dynamic range control, adjusting (e.g., increasing or decreasing) the target noise suppression applied based on the presence or absence of speech audio (e.g., voice activity), and so forth.

The adjusted voice audio is transmitted to the far-end device (act 808).

Figure 9:
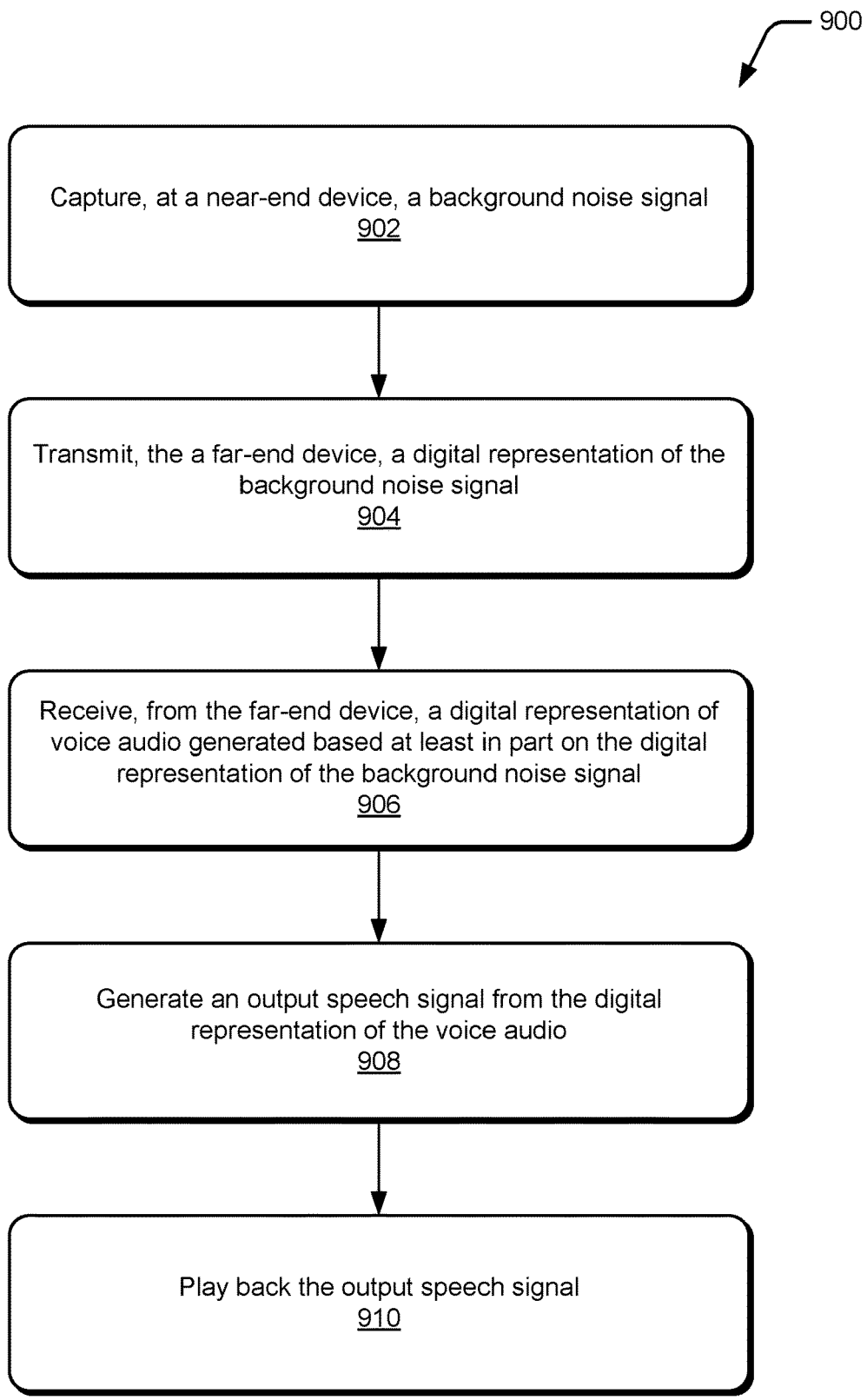
FIG. 9 illustrates another example process for implementing the techniques discussed herein in accordance with one or more embodiments.

FIG. 9 illustrates an example process 900 for implementing the techniques discussed herein in accordance with one or more embodiments. Process 900 is carried out by a device, such as a near-end device, and can be implemented in software, firmware, hardware, or combinations thereof. Process 900 is shown as a set of acts and is not limited to the order shown for performing the operations of the various acts.

In process 900, a background noise signal is captured at the device implementing process 900 (act 902).

A digital representation of the background noise signal is transmitted to a far-end device (act 904). This digital representation may take various forms, such as a noise sample of the background noise, a FFT describing the background noise, and so forth.

A digital representation of voice audio generated based at least in part on the digital representation of the background noise signal is received from the far-end device (act 906).

An output speech signal is generated from the digital representation of the voice audio (act 908).

The output speech signal is played back (act 910).

Figure 10:
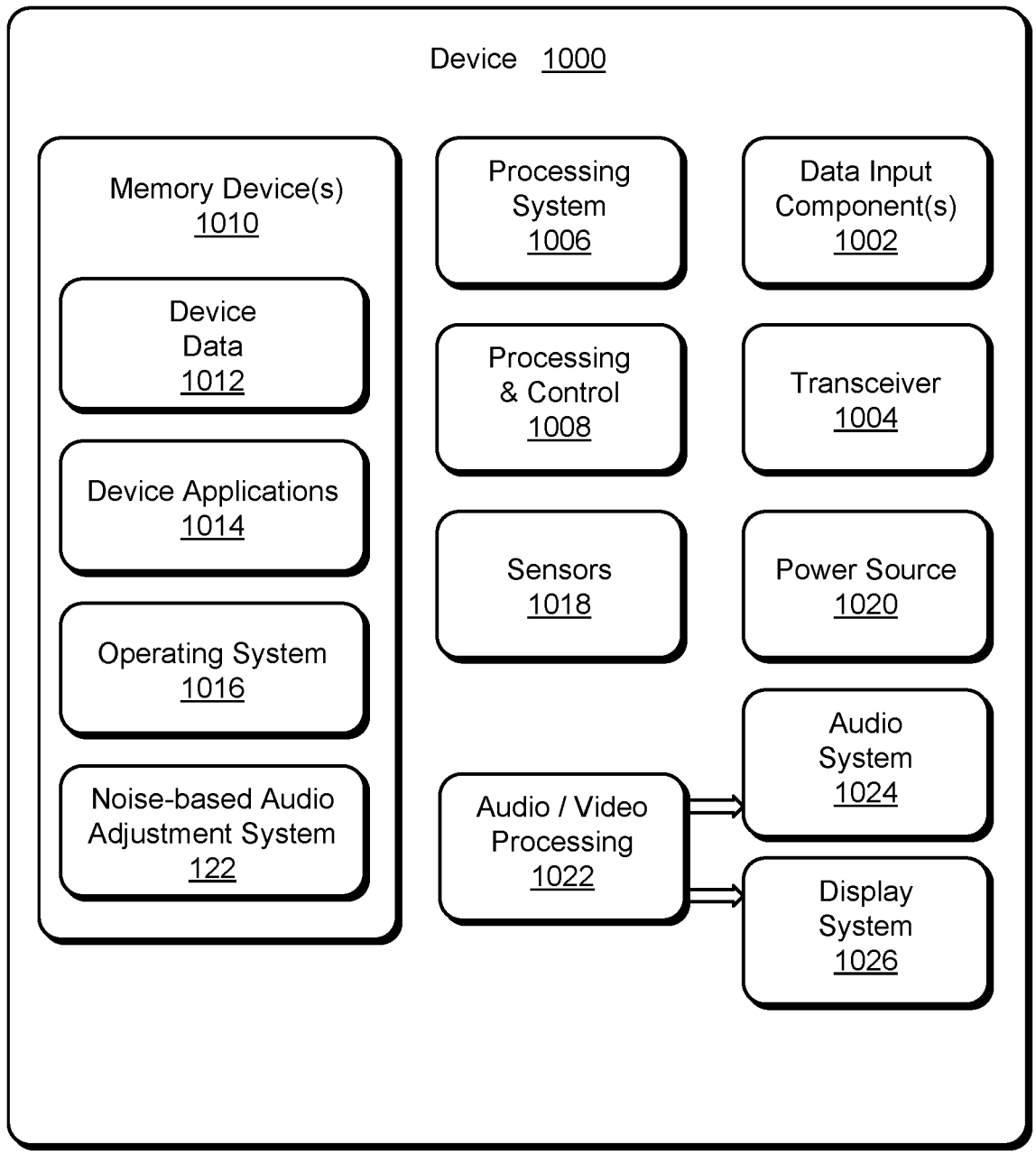
FIG. 10 illustrates various components of an example electronic device that can implement embodiments of the techniques discussed herein.

FIG. 10 illustrates various components of an example electronic device that can implement embodiments of the techniques discussed herein. The electronic device 1000 can be implemented as any of the devices described with reference to the previous FIG.s, such as any type of client device, mobile phone, tablet, computing, communication, entertainment, gaming, media playback, or other type of electronic device. In one or more embodiments the electronic device 1000 includes the noise-based audio adjustment system 122, described above.

The electronic device 1000 includes one or more data input components 1002 via which any type of data, media content, or inputs can be received such as user-selectable inputs, messages, music, television content, recorded video content, and any other type of text, audio, video, or image data received from any content or data source. The data input components 1002 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1002 may also include various other input components such as microphones, touch sensors, touchscreens, keyboards, and so forth.

The device 1000 includes communication transceivers 1004 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1000 includes a processing system 1006 of one or more processors (e.g., any of microprocessors, controllers, and the like) or a processor and memory system implemented as a system-on-chip (SoC) that processes computer-executable instructions. The processing system 1006 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1008. The device 1000 may further include any type of a system bus or other data and command transfer system that couples the various components within the device. A system bus can include any one or combination of different bus structures and architectures, as well as control and data lines.

The device 1000 also includes computer-readable storage memory devices 1010 that enable data storage, such as data storage devices that can be accessed by a computing device, and that provide persistent storage of data and executable instructions (e.g., software applications, programs, functions, and the like). Examples of the computer-readable storage memory devices 1010 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory device 1010 provides data storage mechanisms to store the device data 1012, other types of information or data, and various device applications 1014 (e.g., software applications). For example, an operating system 1016 can be maintained as software instructions with a memory device and executed by the processing system 1006. The device applications 1014 may also include a device manager, such as any form of a control application, software application, signal-processing and control module, code that is native to a particular device, a hardware abstraction layer for a particular device, and so on.

The device 1000 can also include one or more device sensors 1018, such as any one or more of an ambient light sensor, a proximity sensor, a touch sensor, an infrared (IR) sensor, accelerometer, gyroscope, thermal sensor, audio sensor (e.g., microphone), and the like. The device 1000 can also include one or more power sources 1020, such as when the device 1000 is implemented as a mobile device. The power sources 1020 may include a charging or power system, and can be implemented as a flexible strip battery, a rechargeable battery, a charged super-capacitor, or any other type of active or passive power source.

The device 1000 additionally includes an audio or video processing system 1022 that generates one or both of audio data for an audio system 1024 and display data for a display system 1026. In accordance with some embodiments, the audio/video processing system 1022 is configured to receive call audio data from the transceiver 1004 and communicate the call audio data to the audio system 1024 for playback at the device 1000. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for adjusting transmit audio at near-end device based on background noise at far-end device have been described in language specific to features or methods, the subject of the appended claims is not necessarily limited to the specific features or methods described. Rather, the specific features and methods are disclosed as example implementations of techniques for implementing adjusting transmit audio at near-end device based on background noise at far-end device. Further, various different embodiments are described, and it is to be appreciated that each described embodiment can be implemented independently or in connection with one or more other described embodiments. Additional aspects of the techniques, features, and/or methods discussed herein relate to one or more of the following.

In some aspects, the techniques described herein relate to a method at a near-end device, the method including: receiving, from a far-end device, a digital representation of a background noise at the far-end device; receiving, using a microphone at the near-end device, voice audio from a user of the near-end device; adjusting, based at least in part on the digital representation of the background noise, the voice audio for playback at the far-end device; and transmitting, to the far-end device, the adjusted voice audio.

In some aspects, the techniques described herein relate to a method, further including: determining a difference between the background noise at the far-end device and a background noise at the near-end device; and the adjusting including adjusting, based at least in part on the difference between the background noise at the far-end device and the background noise at the near-end device, the voice audio.

In some aspects, the techniques described herein relate to a method, further including capturing background noise at the near-end device and transmitting a digital representation of the background noise at the near-end device to the far-end device.

In some aspects, the techniques described herein relate to a method, further including: receiving additional voice audio from the far-end device that has been adjusted to the near-end device based at least in part on background noise at the near-end device; and playing back the additional voice audio.

In some aspects, the techniques described herein relate to a method, receiving the voice audio from a first microphone at the near-end device, and capturing the background noise at the near-end device using a second microphone at the near-end device.

In some aspects, the techniques described herein relate to a method, further including: determining that a signal quality for communicating with the far-end device has fallen below a threshold level; and adjusting, in response to determining that a signal quality for communicating with the far-end device has fallen below a threshold level, an amount of noise suppression applied to the voice audio from a user of the near-end device.

In some aspects, the techniques described herein relate to a method, further including transmitting the adjusted voice audio to multiple far-end devices.

In some aspects, the techniques described herein relate to a method, further including: determining a difference between a background noise at the near-end device and background noises at each of the multiple far-end devices; and the adjusting including adjusting, based at least in part on a smallest difference between the background noise at the near-end device and the background noise at one of the multiple far-end devices, the voice audio.

In some aspects, the techniques described herein relate to a method, wherein the adjusting includes at least one of adjusting a target level of noise suppression, adjusting an amount of transmit gain used, adjusting a shape of transmit equalization, or adjusting compression or expansion thresholds used for dynamic range control.

In some aspects, the techniques described herein relate to a method at a near-end device, the method including: capturing, at the near-end device, a background noise signal; transmitting, to a far-end device, a digital representation of the background noise signal; receiving, from the far-end device, a digital representation of voice audio generated based at least in part on the digital representation of the background noise signal; generating an output speech signal from the digital representation of the voice audio; and playing back the output speech signal.

In some aspects, the techniques described herein relate to a method, further including: receiving, from the far-end device, a digital representation of a background noise at the far-end device; receiving, using a microphone at the near-end device, voice audio from a user of the near-end device; adjusting, based at least in part on the digital representation of the background noise at the far-end device, the voice audio for playback at the far-end device; and transmitting, to the far-end device, the adjusted voice audio.

In some aspects, the techniques described herein relate to a computing device including: a processor implemented in hardware; a microphone; and a computer-readable storage media having stored thereon multiple instructions that, responsive to execution by the processor, cause the processor to perform acts including: receiving, from a far-end device, a digital representation of a background noise at the far-end device; receiving, using the microphone, voice audio from a user of the computing device; adjusting, based at least in part on the digital representation of the background noise, the voice audio for playback at the far-end device; and transmitting, to the far-end device, the adjusted voice audio.

In some aspects, the techniques described herein relate to a computing device, the acts further including: determining a difference between the background noise at the far-end device and a background noise at the computing device; and the adjusting including adjusting, based at least in part on the difference between the background noise at the far-end device and the background noise at the computing device, the voice audio.

In some aspects, the techniques described herein relate to a computing device, the acts further including capturing background noise at the computing device and transmitting a digital representation of the background noise at the computing device to the far-end device.

In some aspects, the techniques described herein relate to a computing device, the acts further including: receiving additional voice audio from the far-end device that has been adjusted to the computing device based at least in part on background noise at the computing device; and playing back the additional voice audio.

In some aspects, the techniques described herein relate to a computing device, further including an additional microphone, and the acts further including receiving the voice audio from the microphone, and capturing the background noise at the computing device using the additional microphone.

In some aspects, the techniques described herein relate to a computing device, the acts further including: determining that a signal quality for communicating with the far-end device has fallen below a threshold level; and ceasing, in response to determining that a signal quality for communicating with the far-end device has fallen below a threshold level, transmitting the digital representation of the background noise at the computing device to the far-end device.

In some aspects, the techniques described herein relate to a computing device, the acts further including transmitting the adjusted voice audio to multiple far-end devices.

In some aspects, the techniques described herein relate to a computing device, the acts further including: determining a difference between a background noise at the computing device and background noises at each of the multiple far-end devices; and the adjusting including adjusting, based at least in part on a smallest difference between the background noise at the computing device and the background noise at one of the multiple far-end devices, the voice audio.

In some aspects, the techniques described herein relate to a computing device, wherein the adjusting includes at least one of adjusting a target level of noise suppression, adjusting an amount of transmit gain used, adjusting a shape of transmit equalization, or adjusting compression or expansion thresholds used for dynamic range control.

What is claimed is:

1. A method at a near-end device, the method comprising:
    receiving, from a far-end device, a digital representation of a background noise at the far-end device;
    receiving, using a microphone at the near-end device, voice audio from a user of the near-end device, the voice audio including speech and background noise at the near-end device;
    determining a representation of the background noise at the near-end device by filtering the speech from the voice audio from the user of the near-end device;
    adjusting, based at least in part on the digital representation of the background noise at the far-end device, the voice audio for playback at the far-end device by enhancing a characteristic of the speech of the voice audio based on a difference between the background noise at the far-end device and the background noise at the near-end device; and
    transmitting, to the far-end device, the adjusted voice audio.

2. The method of claim 1, further comprising:
    determining the difference between the background noise at the far-end device and the background noise at the near-end device; and
    the adjusting including adjusting, based at least in part on the difference between the background noise at the far-end device and the background noise at the near-end device, the voice audio and post-processing the voice audio for playback at the far-end device.

3. The method of claim 2, further comprising:
    determining that a background noise level at the far-end device exceeds a background noise level at the near-end device; and
    reducing an amount of near-end background noise that is removed in response to the background noise level at the far-end device exceeding the background noise level at the near-end device.

4. The method of claim 1, further comprising capturing background noise at the near-end device and transmitting a digital representation of the background noise at the near-end device to the far-end device.

5. The method of claim 4, further comprising:
    receiving additional voice audio from the far-end device that has been adjusted to the near-end device based at least in part on background noise at the near-end device; and
    playing back the additional voice audio.

6. The method of claim 4, receiving the voice audio from a first microphone at the near-end device, and capturing the background noise at the near-end device using a second microphone at the near-end device.

7. The method of claim 4, further comprising:
    determining that a signal quality for communicating with the far-end device has fallen below a threshold level; and
    adjusting, in response to determining that a signal quality for communicating with the far-end device has fallen below a threshold level, an amount of noise suppression applied to the voice audio from a user of the near-end device.

8. The method of claim 1, further comprising transmitting the adjusted voice audio to multiple far-end devices.

9. The method of claim 8, further comprising:
    determining a difference between a background noise at the near-end device and background noises at each of the multiple far-end devices; and
    the adjusting including adjusting, based at least in part on a smallest difference between the background noise at the near-end device and the background noise at one of the multiple far-end devices, the voice audio.

10. The method of claim 1, wherein the adjusting includes at least one of adjusting a target level of noise suppression, adjusting an amount of transmit gain used, adjusting a shape of transmit equalization, or adjusting compression or expansion thresholds used for dynamic range control.

11. The method of claim 1, further comprising:
    determining that a voice level difference between a voice level at the far-end device and a voice level at the near-end device is below a threshold level; and
    further adjusting the voice audio for playback at the far-end device to increase the voice level difference.

12. A method at a near-end device, the method comprising:
    capturing, at the near-end device, a background noise signal;
    determining a digital representation of the background noise signal at the near-end device by filtering speech from background noise of the background noise signal;
    transmitting, to a far-end device, the digital representation of the background noise signal;
    receiving, from the far-end device, a digital representation of voice audio generated based at least in part on the digital representation of the background noise signal transmitted to the far-end device;
    generating an output speech signal from the digital representation of the voice audio; and
    playing back the output speech signal.

13. The method of claim 12, further comprising:
    receiving, from the far-end device, a digital representation of a background noise at the far-end device;
    receiving, using a microphone at the near-end device, voice audio from a user of the near-end device, the voice audio including the speech and the background noise at the near-end device;
    adjusting, based at least in part on the digital representation of the background noise at the far-end device, the voice audio for playback at the far-end device by enhancing a characteristic of the speech at the near-end device based on a difference between a background noise at the far-end device and the background noise at the near-end device; and transmitting, to the far-end device, the adjusted voice audio.

14. A computing device comprising:

a processor implemented in hardware;

a microphone; and a computer-readable storage media having stored thereon multiple instructions that, responsive to execution by the processor, cause the processor to perform acts including:

receiving, from a far-end device, a digital representation of a background noise at the far-end device;

receiving, using the microphone, voice audio from a user of the computing device, the voice audio including speech and background noise at the computing device;

determining a representation of the background noise at the computing device by filtering the speech from the voice audio from the user of the computing device;

adjusting, based at least in part on the digital representation of the background noise at the far-end device, the voice audio for playback at the far-end device by enhancing a characteristic of the speech of the voice audio based on a difference between the background noise at the far-end device and the background noise at the computing device; and transmitting, to the far-end device, the adjusted voice audio.

15. The computing device of claim 14, the acts further including:

determining a difference between the background noise at the far-end device and a background noise at the computing device; and the adjusting including adjusting, based at least in part on the difference between the background noise at the far-end device and the background noise at the computing device, the voice audio.

16. The computing device of claim 14, the acts further including capturing background noise at the computing device and transmitting a digital representation of the background noise at the computing device to the far-end device.

17. The computing device of claim 16, the acts further including:

receiving additional voice audio from the far-end device that has been adjusted to the computing device based at least in part on background noise at the computing device; and playing back the additional voice audio.

18. The computing device of claim 16, further comprising an additional microphone, and the acts further including receiving the voice audio from the microphone, and capturing the background noise at the computing device using the additional microphone.

19. The computing device of claim 16, the acts further including:

determining that a signal quality for communicating with the far-end device has fallen below a threshold level; and ceasing, in response to determining that a signal quality for communicating with the far-end device has fallen below a threshold level, transmitting the digital representation of the background noise at the computing device to the far-end device.

20. The computing device of claim 14, the acts further including:

transmitting the adjusted voice audio to multiple far-end devices;

determining a difference between the background noise at the computing device and background noises at each of the multiple far-end devices; and the adjusting including adjusting, based at least in part on a smallest difference between the background noise at the computing device and the background noise at one of the multiple far-end devices, the voice audio.

* * * * *